United States Patent
Hamlin et al.

(10) Patent No.: US 11,662,695 B2
(45) Date of Patent: May 30, 2023

(54) INFORMATION HANDLING SYSTEM INFRARED PROXIMITY DETECTION WITH DISTANCE REDUCTION DETECTION

(71) Applicant: Dell Products L.P., Round Rock, TX (US)

(72) Inventors: Daniel L. Hamlin, Round Rock, TX (US); Vivek Viswanathan Iyer, Austin, TX (US); Timothy C. Shaw, Austin, TX (US); Allen B. McKittrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 831 days.

(21) Appl. No.: 16/599,222

(22) Filed: Oct. 11, 2019

(65) Prior Publication Data
US 2021/0109486 A1    Apr. 15, 2021

(51) Int. Cl.
*G05B 13/02* (2006.01)
*G06F 1/16* (2006.01)
(Continued)

(52) U.S. Cl.
CPC ........ *G05B 13/0265* (2013.01); *G01S 7/4808* (2013.01); *G01S 17/04* (2020.01);
(Continued)

(58) Field of Classification Search
CPC .......... G09G 2330/021; G09G 3/3406; G09G 2330/022; G09G 2354/00;
(Continued)

(56) References Cited

U.S. PATENT DOCUMENTS 7,714,265 B2  5/2010  Fadell et al.
8,363,098 B2  1/2013  Rosener et al.
(Continued)

FOREIGN PATENT DOCUMENTS

CA    2027515    7/2000
CA    2838280    12/2012
(Continued)

OTHER PUBLICATIONS

Pidgeon, Elana, "Windows 10 Tip: How to Enable Focus Assist in the Windows Apr. 10, 2018 Update," downloaded from https://blogs.windows.com/windowsexperience/2018/05/09/windows-10-tip-how-to-enable-focus-assist-in-the-windows-10-april-2018-update/ Feb. 28, 2020, 7 pages.
(Continued)

*Primary Examiner* — Olumide Ajibade Akonai
(74) *Attorney, Agent, or Firm* — Zagorin Cave LLP; Robert W. Holland (57) ABSTRACT

An information handling system manages operation of an infrared time of flight sensor to provide accurate and timely user presence and absence detection through monitoring of the time of flight distance detection for indications of object velocity that validates or invalidates a transition between the user presence and user absence states. An integrated sensor hub in a central processing unit stores distances received from the infrared time of flight sensor in a distance table in association with a time stamp of the distance measurement. During monitoring of distances received from the infrared time of flight sensor, if the integrated sensor hub detects a user absence or presence, validation of the transition is performed by analyzing the stored distances to determine a vector of velocity at the state transition.

18 Claims, 4 Drawing Sheets

(51) Int. Cl.
*G06F 3/14* (2006.01)
*G01S 7/48* (2006.01)
*G01S 17/04* (2020.01)
*G06F 21/31* (2013.01)
*G06F 1/3231* (2019.01)
*G06F 1/3234* (2019.01)

(52) U.S. Cl.
CPC .............. *G06F 1/1684* (2013.01); *G06F 3/14* (2013.01); *G06F 1/3231* (2013.01); *G06F 1/3265* (2013.01); *G06F 21/31* (2013.01)

(58) Field of Classification Search
CPC . G09G 2360/144; G06F 1/163; G06F 3/0484; G06F 3/013; G06F 3/038; G06F 3/017; G06F 1/3265; G06F 1/1613; G06F 1/3262; G06F 1/3215; G06F 1/3231; G06F 1/3287; G06F 1/3206; G06F 1/3234; G06F 1/3203; G06F 1/1684; G06F 3/14; G06F 21/31; G06F 21/32; G01S 13/04; G01S 7/4808; G01S 17/04; G01S 7/51; G01S 17/08; H04W 4/80; H04W 88/02; G05B 13/0265; Y02D 10/00
See application file for complete search history.

(56) References Cited

U.S. PATENT DOCUMENTS

| | | | |
|---|---|---|---|
| 8,593,277 | B2 | 11/2013 | Nath et al. |
| 8,760,631 | B2 | 6/2014 | Ritter et al. |
| 9,176,559 | B2 * | 11/2015 | Oh .................... G06F 3/0428 |
| 9,378,342 | B2 | 6/2016 | Robison et al. |
| 9,672,627 | B1 | 6/2017 | Ramaswamy |
| 10,071,706 | B2 | 9/2018 | Ette et al. |
| 10,514,256 | B1 | 12/2019 | Kamarshi et al. |
| 10,708,653 | B1 * | 7/2020 | Stinson .............. H04N 21/4415 |
| 10,819,920 | B1 | 10/2020 | Hamlin |
| 11,475,470 | B2 | 10/2022 | Bronicki |
| 2004/0181702 | A1 * | 9/2004 | Cheng .................. G06F 1/3203 713/320 |
| 2006/0271287 | A1 * | 11/2006 | Gold ................... G06F 3/04847 701/426 |
| 2007/0139392 | A1 | 6/2007 | Kim |
| 2011/0310005 | A1 | 12/2011 | Chen |
| 2012/0287035 | A1 | 11/2012 | Valko |
| 2013/0346084 | A1 | 12/2013 | Archambault et al. |
| 2014/0085221 | A1 | 3/2014 | Kim |
| 2014/0109210 | A1 | 4/2014 | Borzycki et al. |
| 2014/0215248 | A1 | 7/2014 | Cheng |
| 2014/0333581 | A1 * | 11/2014 | Cormier, Jr. .......... G06F 1/3265 345/174 |
| 2015/0085060 | A1 | 3/2015 | Fish |
| 2015/0098174 | A1 * | 4/2015 | Song .................... G06F 1/1626 361/679.21 |
| 2016/0054436 | A1 * | 2/2016 | Lee ........................ G09G 3/20 345/87 |
| 2016/0127765 | A1 | 5/2016 | Robinson |
| 2017/0205876 | A1 | 7/2017 | Vidal |
| 2018/0275752 | A1 | 9/2018 | Peterson |
| 2018/0321731 | A1 | 11/2018 | Alfano et al. |
| 2019/0034609 | A1 | 1/2019 | Yang |
| 2019/0213309 | A1 | 7/2019 | Morestin |
| 2019/0266337 | A1 | 8/2019 | Sengupta |
| 2019/0379779 | A1 * | 12/2019 | Zhang ............... H04M 1/72454 |
| 2020/0142471 | A1 | 5/2020 | Azam |
| 2020/0227004 | A1 * | 7/2020 | Zuo ........................ G09G 5/003 |
| 2020/0251042 | A1 * | 8/2020 | Wang ................... G09G 3/2092 |
| 2020/0373810 | A1 | 11/2020 | Channaiah |
| 2021/0074072 | A1 | 3/2021 | Desai |
| 2021/0132769 | A1 | 5/2021 | Parikh et al. |

FOREIGN PATENT DOCUMENTS

| | | |
|---|---|---|
| CN | 103347437 | 10/2013 |
| EP | 2472424 | 7/2012 |
| WO | 2021047435 | 3/2021 |

OTHER PUBLICATIONS

Reddit, "Windows 10" Comments downloaded from https://www.reddit.com/r/Windows10/comments/9d7ohc/notifications_are_queued_up_and_displayed_in/ on Feb. 28, 2020, 2 pages.

U.S. Appl. No. 16/599,220, filed Oct. 11, 2019, entitled "Information Handling System Proximity Sensor with Mechanically Adjusted Field of View" to Inventors Daniel L. Hamlin et al.

U.S. Appl. No. 16/419,779, filed May 22, 2019, entitled "Augmented Information Handling System User Presence Detection" to Inventors Daniel L. Hamlin et al.

U.S. Appl. No. 16/599,224, filed Oct. 11, 2019, entitled "Information Handling System Infrared Proximity Detection with Ambient Light Management" to Inventors Daniel L. Hamlin.

U.S. Appl. No. 16/599,226, filed Oct. 11, 2019, entitled "Information Handling System Infrared Proximity Detection with Frequency Domain Modulation" to Inventors Daniel L. Hamlin et al.

U.S. Appl. No. 16/778,787, filed Jan. 31, 2020, entitled "Information Handling System Notification Presentation Based Upon User Presence Detection" to Inventors Daniel L. Hamlin et al.

U.S. Appl. No. 16/778,798, filed Jan. 31, 20, entitled "Information Handling System Peripheral Enhanced User Presence Detection" to Inventors Daniel L. Hamlin et al.

U.S. Appl. No. 16/778,805, filed Jan. 31, 2020, entitled "Information Handling System Adaptive User Presence Detection" to Inventors Daniel L. Hamlin et al.

Onarlioglu, K., et al., Overhaul: Input-Driven Access Control for Better Privacy on Traditional Operating systems, 2016 46th Annual IEEE/IFIP International Conference on Dependable Systems and Networks (DSN), https://ieeexplore.ieee.org/stamp/stamp.jsp?tp=&arnumber=7579762 (Year 2016).

Mrazovac, B., et al., Smart Audio/Video Playback Control Based on Presence Detection and User Localization in Home Environment, 2011 Second Eastern European Regional Conference on the Engineering of Computer Based Systems, http://ieeexplore.ieee.org/stamp/stamp.jsp?tp=&arnumber=6037513 (Year: 2011).

* cited by examiner

INFORMATION HANDLING SYSTEM INFRARED PROXIMITY DETECTION WITH DISTANCE REDUCTION DETECTION

BACKGROUND OF THE INVENTION

Field of the Invention

The present invention relates in general to the field of information handling system presence detection, and more particularly to an information handling system infrared proximity detection with distance reduction detection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with processing components disposed in a housing and present the information at a display. Desktop information handling systems typically present information as visual images at a peripheral display and accept end user inputs through peripheral input/output (I/O) devices, such as a keyboard and/or mouse. Portable information handling systems typically integrate a display and I/O devices into a portable housing along with a power source, such as a rechargeable battery. Generally, information handling systems include some sort of logic to power down a display if an end user is not viewing presented visual images. Powering down a display reduces power consumption, which increases battery life of portable systems, and increases security by enforcing password protection before again presenting visual images and permitting access to processing resources through I/O devices. Typical "screensaver" logic powers down a display and locks an information handling system after a preset timeout expires without an end user interaction. Generally, once a timeout expires an end user has to make an input at an I/O device to wake the system to input a password. Although this logic tends to save power and increase security, use of a hard timeout means that an end user has to balance the length of the timeout with the inconvenience of interruptions to system use. A typical screensaver timeout of fifteen minutes leaves a considerable window of non-use during which power is consumed and unauthorized access is available.

To provide improved power management and security, a variety of Human Presence Detection (HPD) sensors have been developed. One promising HPD sensor is an infrared time of flight (IRTOF) sensor. IRTOF sensors illuminate an area where an end user is expected, such as in front of a display that presents visual images, with an infrared light source and detects objects based upon time of flight of infrared reflections detected at the sensor. For instance, the IRTOF sensor scans the IR light source as a narrow beam across plural sectors to detect changes in distance to objects in each sector so that a detected object that moves over time indicates a human presence. IRTOF sensors provide a high degree of accuracy and sensitivity so that a very rapid response to user absence and presence is provided. Thus, as long as the IRTOF sensor detects an end user in the field of view, the system will not timeout so that the end user's viewing is not interrupted. If the IRTOF sensor fails to detect an end user in the field of view, a very rapid timeout may be enforced since the IRTOF sensor tends to have an accurate and rapid user absence detection. An aggressive timing configuration that quickly turns off a display and locks a system at user absence detection tends to decrease power consumption and increase system security.

One difficulty with IRTOF sensors is that rapid and highly sensitive detection of presence and absence risks the application of false user absence detections that result in end user interruptions of system use. Although IRTOF sensors are highly sensitive and accurate, variations in operating conditions can result in false user absent indications. For example, external sources of infrared light, such as ambient light levels and industrial point light source, can interfere with IRTOF sensor resolution resulting in false absent or false present indications. To avoid such interference, IRTOF sensors typically include a calibration process run at start-up that detects operating conditions and adjusts present and absent detection levels. For instance, in an environment having high levels of infrared interference, IRTOF sensors tend to have shorter detection ranges and less accuracy. The calibration process may include selection of an infrared frequency by the IRTOF sensor that provides reduced interference. A difficulty with such calibration is that environmental conditions change during information handling system operations, which can introduce variations in IRTOF sensor accuracy.

SUMMARY OF THE INVENTION

Therefore, a need has arisen for a system and method which adapts IRTOF sensor operations at an information handling system for improved end user presence and/or absence detection accuracy based upon changes in velocity detected at presence absence state transitions.

In accordance with the present invention, a system and method are provided which substantially reduce the disadvantages and problems associated with previous methods and systems for managing an IRTOF sensor at an information handling system to detect end user presence and/or absence. Transitions between end user absence and presence states sensed by an infrared time of flight sensor are validated by comparing distances detected relative to the end user at around the time of the transition to determine a velocity vector of the end user. A velocity vector away from the information handling system tends to validate user absence, and a velocity vector towards the information handling system tends to validate user present.

More specifically, an information handling system processes information with a processor and memory for presentation at a display as visual images. An IRTOF sensor monitors a zone at the display associated with end user presence and absence and reports a presence or absence state to a proximity detection application running on the information handling system through a hardware and operating system interface, such as an integrated sensor hub that interfaces with an operating system driver. To avoid false user presence and/or absence report disruption of end user interactions with the information handling system, the proximity detection application validates IRTOF sensor results by reference to a velocity of an end user determined from stored distances retrieved from memory. For instance, an algorithm driver executes on a central processing unit integrated sensor hub to monitor distances reported from the IRTOF sensor. A distance wake driver stores the distances in memory with a time stamp. When the algorithmic driver determines a transition between the user presence and absence states, the distance wake driver retrieves stored distances sensed by the IRTOF sensor and determines a velocity vector associated with the end user relative to the IRTOF sensor. Based upon the velocity vector, the wake distance driver validates the transition or resets the transition to delay implementation of a change of presentation of visual images at the information handling system.

The present invention provides a number of important technical advantages. One example of an important technical advantage is that an IRTOF sensor provides more reliable and timely transitions between end user presence and absence indications that manage presentation of visual images by and access to an information handling system. By applying a velocity vector analysis to validate or invalidate end user presence and/or absence state transitions, the reliability of the IRTOF sensor is improved for detection of user absence and presence. System level management of the IRTOF sensor from an integrated sensor hub adapts operation of the IRTOF sensor to validate presence and absence state transitions so that processing and power resources are preserved during normal operations. For instance, velocity vector determination and application are limited to transitions between user absence and presence states to reduce analysis of IRTOF sensor information to critical transition points. Reliability of IRTOF sensor indications derived at a system level, such as by other indications of end user absence and presence, provides a basis for machine learning of optimal IRTOF presence and absence detection, such as by analysis of velocities during transitions to tie accurate transition determinations to other sensed conditions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system manages an infrared time of flight (IRTOF) sensor with system commands to validate end user presence and absence state transitions by analyzing velocity vectors derived from distances sensed by the IRTOF sensors at around the time of the transition. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
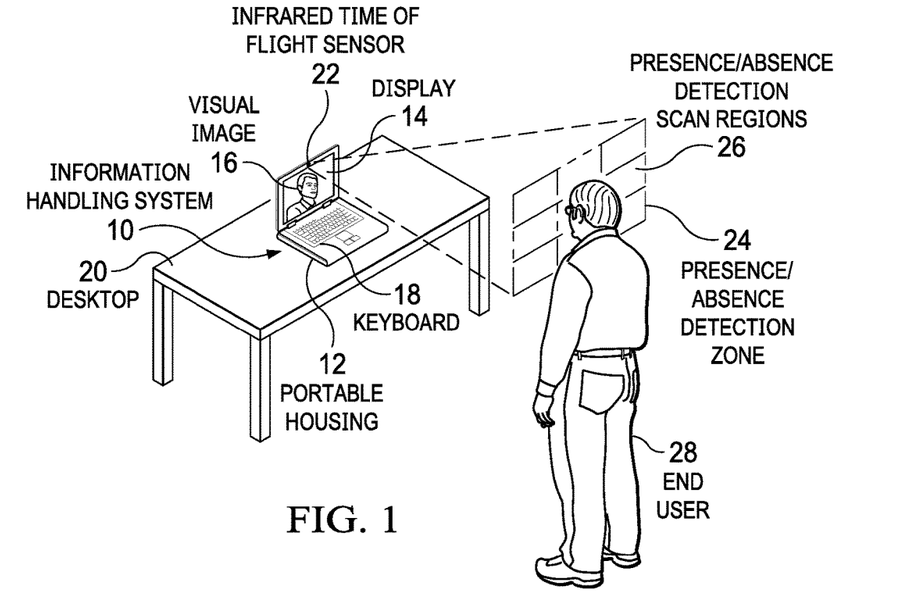
FIG. 1 depicts a portable information handling system monitoring an end user for presence and absence with an infrared time of flight (IRTOF) sensor.

Referring now to FIG. 1, a portable information handling system 10 monitors an end user 28 for presence and absence with an infrared time of flight (IRTOF) sensor 22. Information handling system 10 processes information with processing components disposed in a portable housing 12. In the example embodiment, portable housing 12 has rotationally coupled portions that rotate to a clamshell mode having a display 14 integrated in one housing portion raised to a vertical viewing position to present a visual image 16 over top of a keyboard 18 integrated in a second portion that rests on a desktop 20. End user 28 typically is within a limited distance of portable information handling system 10 when using the system. For instance, to type inputs at keyboard 18, end user 28 is within arm reach; to view visual image 16, end user 28 may have a slightly greater distance, depending on the size of display 14. Although the example embodiment depicts a portable information handling system, alternative embodiments may interact with desktop systems, peripheral displays and televisions.

IRTOF sensor 22 sends pulses of infrared light across a presence/absence detection zone 24 and detects reflections of the infrared light to determine a distance to objects, such as end user 28, within the presence/absence detection zone 24. For instance, IRTOF sensor 22 scans across plural presence/absence detection scan regions 26 in a scan pattern that detects a distance to an object in each region. Over time, animate objects are differentiated from inanimate objects by motion detected with changing distances to the objects in each region. When scan results of IRTOF sensor 22 indicates that a detected object is an end user, a presence detection is provided to the processing components of information handling system 10 so that visual image 16 stays active. When IRTOF sensor 22 indicates that the detected object has left, a user absence indication is provided to the processing components of information handling system 10 so that visual image 16 is removed, such as by powering down display 14. In addition, a user absence indication may be applied by information handling system 10 to lock the system so that it remains secure while end user 28 is not present.

IRTOF sensor 22 provides rapid and accurate user presence and absence detection to reduce power consumption and improve system security, however, if an inaccurate user absence detection is applied as a basis to power down display 14 when an end user is in fact present, the end user's interactions become disrupted. In some instances, IRTOF sensor 22 tends to lose accuracy so that false absence indications applied at information handling system 10 can disrupt end user interactions. For example, interference caused by ambient or point infrared light sources can impact the range and accuracy of IRTOF sensor 22. Generally, IRTOF sensors 22 perform a calibration at power up that attempts to quantify environmental conditions and select an IR frequency from plural available frequencies that will operate most accurately in a sensed environment. In addition, IRTOF sensor 22 adjusts the sensitivity at which it sense infrared reflections based upon the calibration. However, any number of factors can impact such a calibration, such as ambient light conditions or even the color shirt worn by an end user, so that a calibration at start tends to loss effectiveness over time. To maintain accurate user presence and absence detection, information handling system 10 tracks external conditions and adjusts IRTOF sensor 22 infrared sensing so that more accurate and validated user presence and absence are reported.

Figure 2:
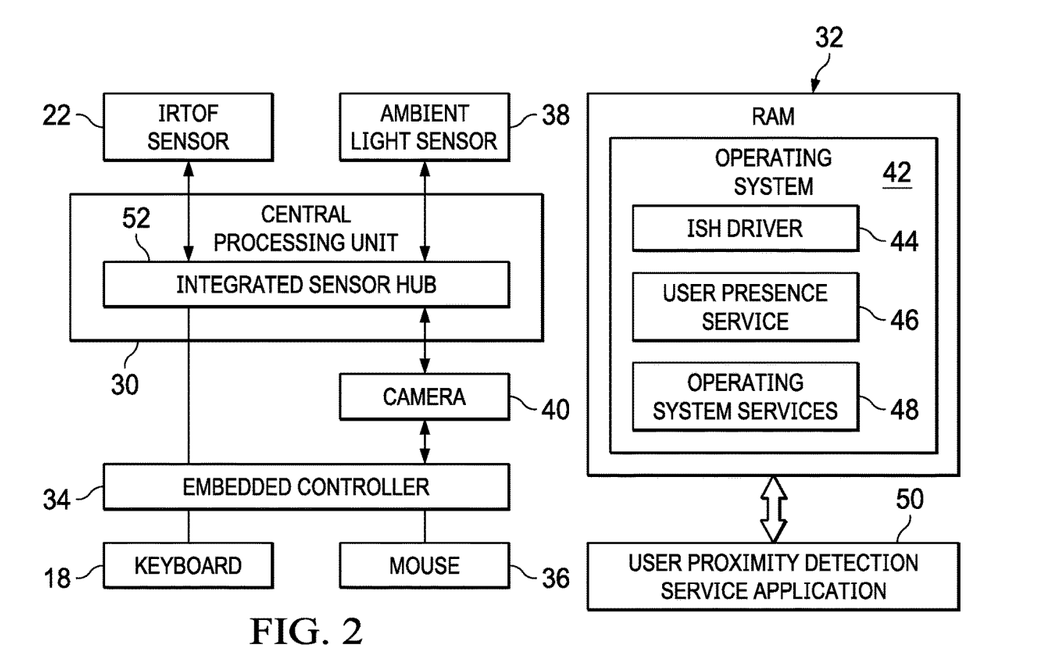
FIG. 2 depicts a block diagram of an information handling system having system level management of IRTOF sensor operations.

Referring now to FIG. 2, a block diagram depicts an information handling system 10 having system level management of IRTOF sensor 22 operations. In the example embodiment, a central processing unit (CPU) 30 executes instructions to process information stored in random access memory (RAM) 32. An embedded controller 34, such as a keyboard controller, manages system operations, such as by applying and removing power at CPU 30 and communicating inputs to CPU 30 from input/output (I/O) devices like keyboard 18 and mouse 36. Various types of peripheral devices and sensors may provide information to CPU 30, such as an ambient light sensor 38, which detects ambient light conditions that impacts display of visual images, and a camera 40, which captures images that may be used to support videoconferencing. In the various embodiments, sensor inputs to CPU 30 may be managed by embedded controller 34 or by sensor functionality integrated within CPU 30, such as the Integrated Sensor Hub (ISH) 52 provided in CPU architectures of INTEL. In the example embodiment, ISH 52 interfaces with and manages IRTOF sensor 22.

End user presence or absence states reported from IRTOF sensor 22 to ISH 52 are managed at a system level by an operating system 42 executing on CPU 30 from RAM 32, such as WINDOWS. In the example embodiment, an ISH driver 44 interfaces with ISH 52 to manage ISH 52 interactions with a user presence service 46 providing the ISH driver 44 with an interface for IRTOF sensor 22. The sensed conditions are provided through operating system services 48 to a user proximity detection service application 50, which applies presence and absence indications of IRTOF sensor 22 to power down a display and lock a system. User proximity detection service application 50 is, for example, installed through operating system 48 to distribute the drivers through the operating system and firmware that manages IRTOF sensor 22. As is set forth in U.S. patent application Ser. No. 16/419,779 by Daniel L. Hamlin; Timothy C. Shaw; Vivek Viswanathan Iyer; Allen B. McKittrick, filed on May 22, 2019, entitled Augmented Information Handling System User Presence Detection, and incorporated herein as if fully set forth, a variety of other factors may also be considered when applying user presence and absence indications, such as inputs made by an end user and other conditions that indicate end user presence and absence.

Figure 3:
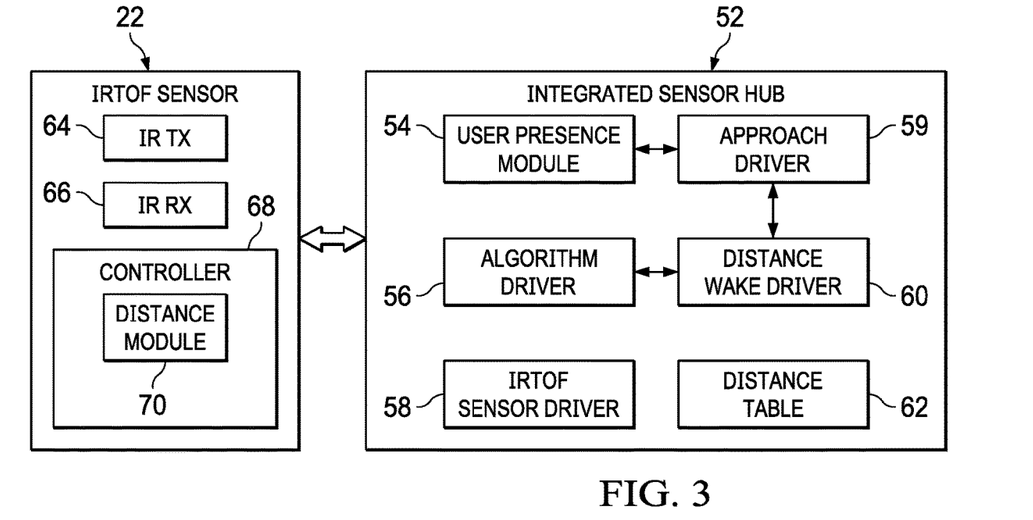
FIG. 3 depicts an example embodiment of logic in an integrated sensor hub that manages IRTOF sensor operations.

Referring now to FIG. 3, an example embodiment depicts logic in an integrated sensor hub 52 that manages IRTOF sensor 22 operations, such as with modules of firmware code stored in flash memory of ISH 52. ISH 52 interfaces with IRTOF sensor 22, such as through an I2C low speed communication link or GPIO, to receive sensed information and configure sensor operations. A sensor driver 58 interfaces with IRTOF sensor 22 to receive data and provides the processed data to an algorithm driver 56 that computes a probability that a user is present and then advertises the results through a user presence module 54 to any subscribed services. IRTOF sensor 22 includes an infrared transmitter (IR TX) 64 that generates infrared illumination and an infrared receiver (IR RX) 66 that receives infrared illumination, including both reflected transmissions of infrared light and interference infrared light from ambient sources. A controller 68 controls IR transmitter 64 and IR receiver 66 to command a scan across a user detection field of view. Controller 68 includes firmware instructions in a distance module 70 that executes to detect a distance based upon infrared illumination that reflects from an object in the field of view of time of flight sensor 22. For instance, distance module 70 determines a distance in each scan region of time of flight sensor 22 based upon a time that passes after transmission of infrared illumination by IR transmitter 64 until reception of reflections of the infrared illumination by IR receiver 66. Distance module 70 reports distances for each region of the scan of IRTOF sensor 22 to IRTOF sensor 58, which provides the distances to algorithm driver 56 for a determination of end user absence or presence.

A distance wake driver 60 executing as a firmware module in ISH 52 interfaces with controller 68 to receive distances scanned for each region of the field of view of IRTOF sensor 22 and stores the distances in a distance table 62. For instance, distance wake driver 60 maintains a circular buffer of most recent distance information stored with time stamps that indicate a time of the distance measurement. Once algorithmic driver 56 analyzes the distance information to determine that a change in state between user presence and absence has occurred, distance wake driver 60 initiates an analysis of distances stored in distance table 62 to validate or invalidate the change in state. If the change in state is validated, distance wake driver 60 commands approach driver 59 to validate the change in state. If the change in state is not validated, distance wake driver 60 resets algorithm driver 56 to further validate the state transition. Once the state transition is validated, user presence module 54 reports the state transition to the operating system for application at the information handling system, such as by turning the display on or off. Generally, distance wake driver 60 validates a user absence when analysis of distances over time indicate that a user has a velocity vector away from IRTOF sensor 22 and validates a user presence when analysis of distances over time indicate that a user has a velocity vector towards IRTOF sensor 22. However, in various embodiments, other types of velocity analysis may be applied such as by tracking motion across scan regions that indicates lateral motion of an end user away from or towards IRTOF sensor 22. In one embodiment, a more in depth analysis of stored distances may include derivation of accelerations from the velocities, which provides a measurement of the quality of the distance of velocity information. In another example embodiment, the velocity and acceleration information may be applied to an end user distance measurement to predict the end user's current position so that a predicted position within a user presence state location can pause a transition to a user absence state until additional scans searching for the end user are accomplished.

In one example embodiment, distance wake driver 60 helps to prevent shutdowns of a display if an end user absence is detected while the end user is at an edge of IRTOF sensor 22 range. Once algorithm driver 56 detects a user absence state, distance wake driver 60 initiates a review of stored distances retrieved from distance table 62 to determine a velocity of the end user's last distance detection, such as for a predetermined time period until the user absence was detected. In some instances, the velocity determination is made from distances having a minimal level of reliability or certainty at measurement, such as with a comparison between different scan regions of IRTOF sensor 22 to find distances that match the profile of an end user in range. If the velocity vector is negative relative to IRTOF sensor 22, thus indicating a last movement towards IRTOF sensor 22 with a closing velocity vector, distance wake driver 60 commands approach driver 59 to initiate a presence restoration event, which rejects the user absence indication and resets all absence processing operations, such as by resetting timers of algorithm driver 56 that count towards an absence and by canceling any transition towards a low power state. If the velocity vector is positive relative to IRTOF sensor 22, thus indicating a last movement away from IRTOF sensor 22 with an opening velocity vector, distance wake driver commands approach driver 59 to validate the user absence state. The effect is to pause a transition to a user absence state with a system level command until a higher confidence of user absence is attained.

In addition to management of IRTOF sensor 22 with logic embedded in ISH 52, the operating system and applications executing on CPU 30 may provide additional and higher order management logic. For instance, machine learning may monitor IRTOF sensor 22 presence and absence indications for accuracy, such as based on other system inputs, and relate the reliability of presence and absence indications to other factors. In one example embodiment, machine learning determines an optimal set of velocities that indicate a transition between user presence and absence states by monitoring user presence and absence detection and differences that are validated or not validated based upon detected velocities. If the user proximity detection service application detects less optimal conditions, such as based upon an indoor or outdoor location, various ambient light color temperatures and/or brightness, a passive viewing user who consumes presented information without making inputs, or other conditions, it may command recognition of more definitive velocity patterns to validate user absence detection. In such an embodiment, the use of more or less definitive velocity indications over time may increase or decrease presence or absence detection reliability as the environmental conditions change allowing for a system specific response to be developed. That is, different condition specific velocity validations may be developed in real time based upon feedback of performance with false detects and false misses. In each example, system level management of IRTOF sensor operations is selectively enforced to optimize user presence and absence detection based upon factors that influence infrared sensor operations and that are not directly discernable at the IRTOF sensor itself.

Figure 4:
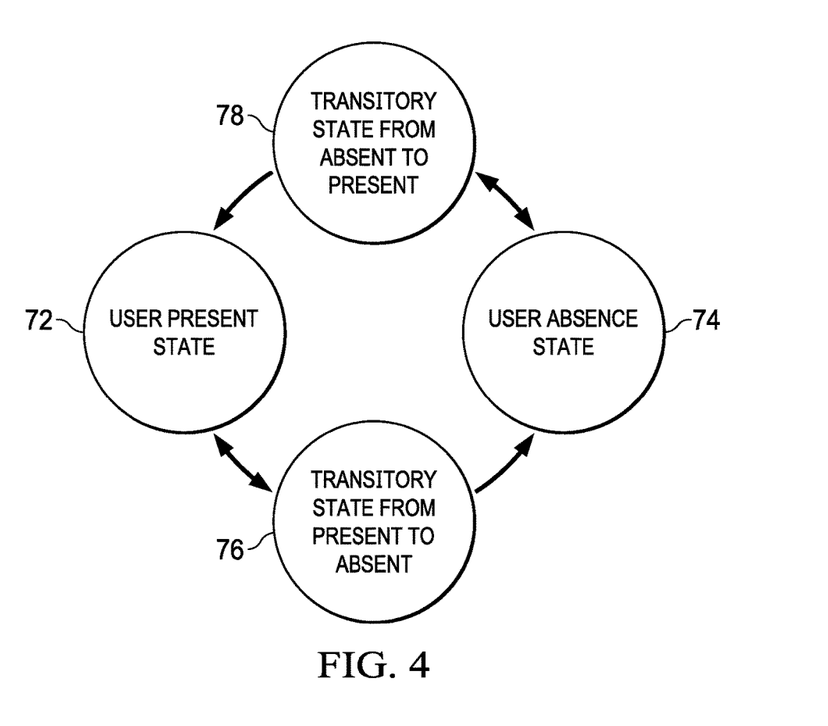
FIG. 4 depicts a state diagram of a transitions between end user presence and absence states validated by velocity vectors derived from IRTOF sensor distances.

Referring now to FIG. 4, a state diagram depicts transitions between end user presence and absence states validated by velocity vectors derived from IRTOF sensor distances. In the end user present state 72, end user operations remain enabled, such as presentation of visual images at a display and input interactions and other accesses provided after normal security measures are met. In the end user absence state 74, the information handling system takes a variety of configurable measures to reduce power and increase security, such as powering down a display and requiring password authentication to reactivate end user access to processing resources. A transitory state from present to absent 76 is initiated at the user present state 72 to provide a transition either back to user presence state 72 or to user absence state 74. In transitory state from present to absent 76, a validation process initiates to confirm that an end user is absent by analyzing the velocity vector of the end user in the last moments of the user present state 72 to determine if the end user had a velocity vector away from the information handling system. During the transitory state, a brief increase in processing and power consumption is experienced along with a brief delay in transition to the user absence state 74. The determination of whether to initiate a velocity-based validation of the user absence state may be based in the ISH based upon the confidence of the user absence determination, by the operating system or by the application that performs the user absence functions based upon other indicia of user presence.

In the example embodiment, partial transitions between user presence state 72 and user absence state 74 are handled separately depending upon the initial state from which the transition initiates. Transitory state from absent to present 78 manages transitions from user absence state 74 to user presence state 72 by either allowing the transition or resetting the user absence state. During both transitory states, the end user is not aware that a state change transition has initiated unless the transitory state allows the state change transition to complete. In the transitory state from absent to present 78, validation relates to a velocity vector towards the information handling system. This prevents a premature user presence state 72 where an end user has approached location of the information handling system and then walked away. If a velocity away from the information handling system is detected, the user absence state remains enforce, although additional logic may be employed to validate a user intent to remain in user absence state 74, such as the proximity to the system and a predicted end user position based upon last detected position and velocity. In the transitory state from present to absent 76, a velocity away from the information handling system tends to confirm transition to the user absence state, although again the final velocity measured with confidence may be analyzed with the final distance to predict and end user position and validate user absence state 74 if the predicted position is outside of a predetermined distance.

Figure 5:
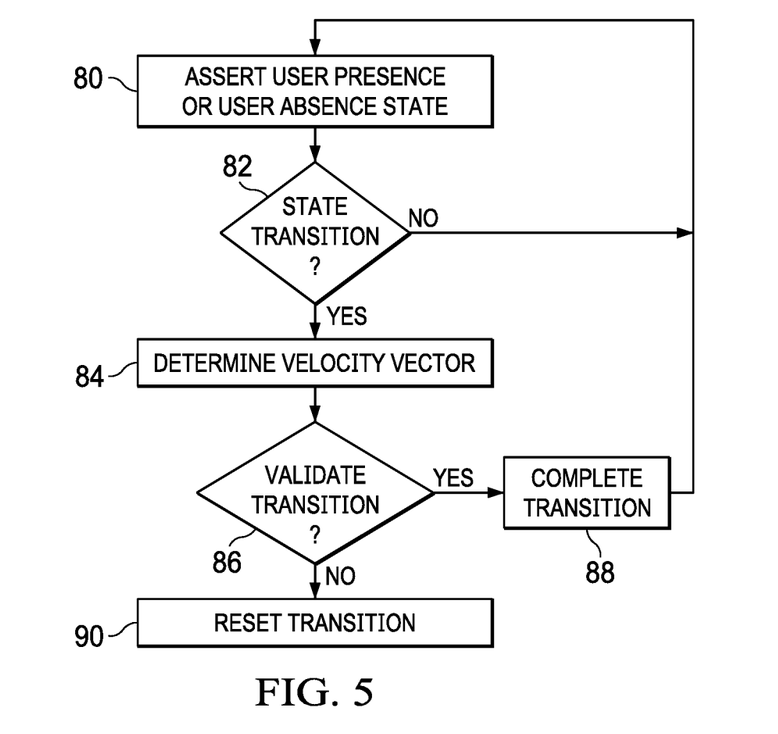
FIG. 5 depicts a flow diagram of a process for validating end user presence and absence state transitions based upon velocity vectors derived from stored IRTOF sensor distance information.

Referring now to FIG. 5, a flow diagram depicts a process for validating end user presence and absence state transactions based upon velocity vectors derived from stored IRTOF sensor distance information. The process starts at step 80 in a user presence state or a user absence state, such as where the IRTOF sensor detects movement or lack of movement of an object in its field of view that indicates an animate object. At step 82, a determination is made of whether a state transition should initiate. For instance, a lack of movement indicates a transition to user absence state while a detection of movement indicates a transition to a user presence state. If a transition is not indicated, the process returns to step 80 to continue monitoring the existing state. If a transition is indicated, the process continues to step 84 to determine a velocity vector of the last detected movement of an object. In the case of a transition to the user absent state, a historical lookup of distances may be constrained to a predetermined time associated with a high confidence that a lack of user presence for that time indicates user absence. At step 86 a determination is made of whether the transition is valid. For instance, a transition to a user presence state is valid with a velocity vector towards the IRTOF sensor and a transition to a user absence state is valid with a velocity vector away from the IRTOF sensor. If the transition is valid, the process continues to step 88 to complete the transition and then to step 90 to monitor the new state. If the transition is not valid, the process continues to reset the transition and the process returns to step 80 to continue monitoring the initial state.

Figure 6:
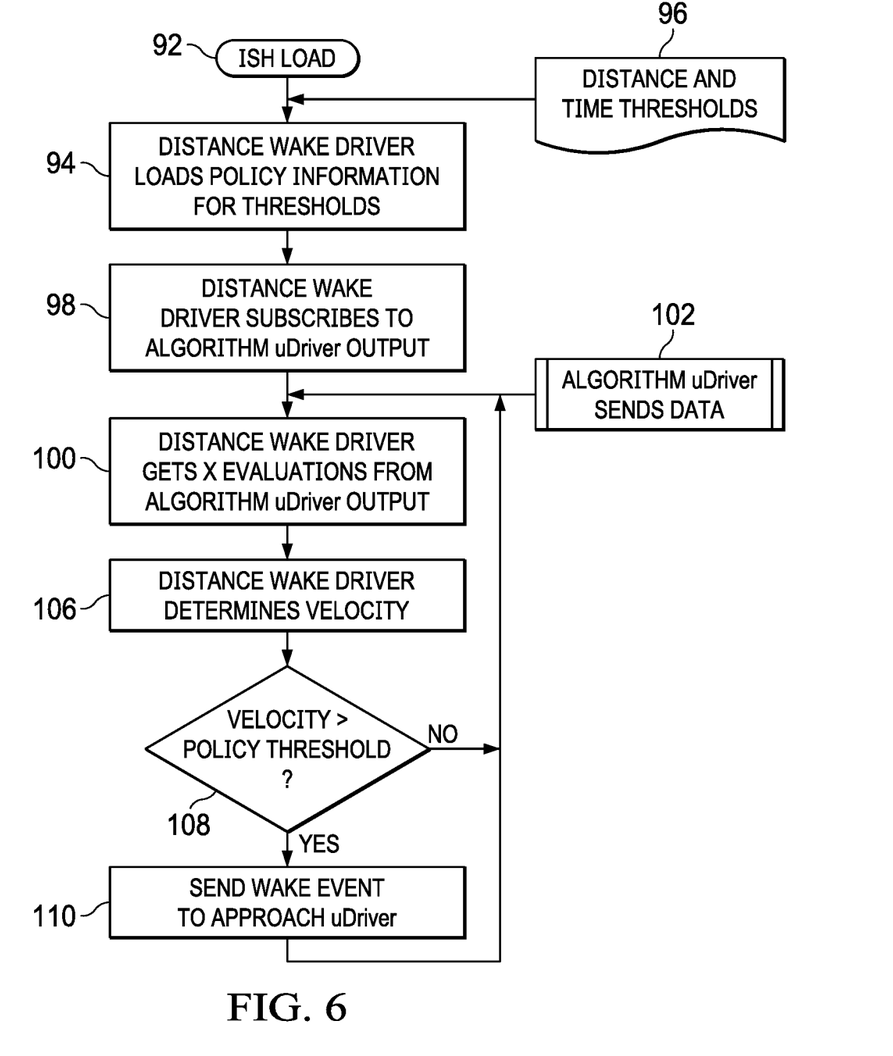
FIG. 6 depicts a flow diagram of a process for validating a transition to a user presence state with velocity vectors derived from IRTOF sensed distances.

Referring now to FIG. 6, a flow diagram depicts a process for validating a transition to a user presence state with velocity vectors derived from IRTOF sensed distances. The process starts at step 92 with load of the ISH, such as at power up. At step 94, the distance wake drive loads policy information for distance and velocity thresholds that are configured to flash memory at step 96. At step 98, the distance wake driver 98 subscribes to the algorithm driver output, which determines transition initiations between user presence and absence states. At step 100, the distance wake driver gets a number (x) of evaluations from the algorithm driver output through subscription at step 102. At step 106, the distance wake driver determines velocity from the distances received through the algorithm driver, such as by subtracting distance measures and dividing the difference by the time interval between the distance measurement timestamps. At step 108 a determination is made of whether the velocity is greater than the policy threshold. If not, the process returns to step 100 to continue monitoring the user presence state. If the velocity is greater than the threshold, such as minimum velocity towards the information handling system, the process continues to step 110 to send a wake event to the approach driver that maintains the system in the user presence state and the process returns to step 100.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions that process information;
a memory disposed in the housing and interfaced with the processor, the memory operable to store the instructions and information;
an embedded controller interfaced with the processor and operable to manage inputs provided from one or more input devices for communication to the processor;
a display interfaced with the processor and operable to present the information as visual images;
an infrared time of flight sensor disposed in the housing and configured to detect user presence and absence by illuminating an area proximate the display with an infrared source and sensing infrared light reflected by an object to determine a distance to the object; and
a proximity detection service executing on the processor and interfaced with the infrared time of flight sensor, the proximity detection service operable to disable presentation of visual images at the display in response to an infrared time of flight sensor user absence state detection and to enable presentation of visual images at the display in response to a user presence state detection, the proximity detection service further operable to store distances detected by the infrared time of flight sensor in association with a time flag at which each distance was detected, to compare the distances to determine a velocity associated with the object, and to validate a transition between the user presence and user absence states by reference to the velocity;
wherein the infrared time of flight sensor scans plural regions to detect a distance in each region and the proximity detection service determines a velocity in each of the plural regions and validates the transition with a region-by-region comparison of the velocities.

2. The information handling system of claim 1 wherein:
the transition comprises a transition from the user absence state to the user presence state; and
the proximity detection service validates the transition to the user presence state when the velocity indicates motion toward the display.

3. The information handling system of claim 2 wherein the proximity detection service, in response to the velocity indicating motion toward the display, resets any timers counting towards a transition to a user absence state.

4. The information handling system of claim 1 wherein:
the transition comprises a transition from the user presence state to the user absence state; and
the proximity detection service validates the transition to the user absence state when the velocity indicates motion away from the display.

5. The information handling system of claim 4 wherein the proximity detection service, in response to the velocity indicating motion away from the display resets any timers counting towards a transition to a user absence state.

6. The information handling system of claim 1 wherein the proximity detection service determines the velocity only at initiation of a transition between the user presence and user absence states.

7. The information handling system of claim 1 wherein the proximity detection service comprises logic executing in an integrated sensor hub of the processor.

8. A method for detecting user presence and user absence states at an information handling system, the method comprising:
monitoring proximate a display of the information handling system with an infrared time of flight sensor to detect the user presence and user absence states with distances to an object measured by the infrared time of flight sensor;
storing the distances in memory, each distance associated with a time at which the distance is measured;
applying the distances to determine velocities associated with the object; and
validating a transition between the user presence and user absence states with a vector of the velocities before altering operation of the information handling system in response to the transition.

9. The method of claim 8 wherein:
the transition comprises a transition from a user absence state to a user presence state; and the velocity vector validating the user presence state is a velocity towards the information handling system.

10. The method of claim 8 further comprising:
the transition comprises a transition from a user presence state to a user absence state; and
the velocity vector validating the user absence state is a velocity away from the information handling system.

11. The method of claim 8 further comprising:
presenting visual images at a display of the information handling system;
detecting a user presence state with the infrared time of flight sensor;
initiating a transition to a user absence state in response to detection by the infrared time of flight sensor of a lack of movement;
retrieving the stored distances;
validating the transition to the user absence state if the stored distances indicate a movement having a velocity away from the information handling system; and
in response to the validating, removing the visual images.

12. The method of claim 8 further comprising:
detecting a user absence state with the infrared time of flight sensor;
initiating a transition to a user presence state in response to detection by the infrared time of flight sensor of movement;
retrieving the stored distances;
validating the transition to the user presence state if the stored distances indicate a movement having a velocity toward the information handling system; and
in response to the validating, presenting visual images at a display of the information handling system.

13. The method of claim 8 further comprising:
initiating a transition from a user presence state to a user absence state in response to a lack of movement detected by the infrared time of flight sensor;
in response to the initiating, retrieving the stored distances;
analyzing the stored distances to determine a most recent movement detected by the infrared time of flight sensor;
analyzing the most recent movement to determine a velocity towards the information handling system; and
in response to velocity towards the information handling system, resetting the initiating the transition from the user presence state.

14. A system for detecting end user presence and absence states at an information handling system, the system comprising:
an infrared time of flight sensor operable to illuminate an object with an infrared light source, to detect reflections from the object of the infrared illumination, and to determine a distance to the object based on the reflections;
a controller external to and interfaced with the infrared time of flight sensor, the controller operable to retrieve the distances; and
a non-transient memory interfaced with the controller and storing:
a distance table of plural distances sensed by the time of flight sensor, each distance having a time stamp of the time at which the distance was sensed; and
instructions that when executed on the controller:
applies distances received from the time of flight sensor:
by storing the distances in the distance table,
by applying the distances to initiate a transition between the user presence and user absence states, and
upon initiating the transition between the user presence and user absence states, by retrieving the distances from the distance table to determine a velocity of the object, the velocity applied to validate the transition between the user presence and user absence states before issuing a change of the user presence and absence state to the information handling system.

15. The system of claim 14 wherein the instructions when executed further:
detects the velocity as a vector towards the infrared time of flight sensor or away from the time of flight sensor;
validates the transition from a user presence state to a user absence state if the velocity vector is away from the infrared time of flight sensor; and
validates the transition from a user absence state to a user presence state if the velocity vector is towards the infrared time of flight sensor.

16. The system of claim 14 wherein the instructions when executed further:
determine a distance of the object associated with the velocity; and
validates the transition in part by applying the distance and velocity to predict if the object is in range of the infrared time of flight sensor.

17. The system of claim 14 wherein the instructions when executed further:
detect an object in the user absence state;
in response to detecting the object, initiate a transition from the user absence state to the user presence state;
retrieves the distances from the distance table to determine the velocity;
validates the user presence state if the velocity has a vector towards the infrared time of flight sensor; and
invalidates the user presence state if the velocity has a vector away from the user presence state.

18. The system of claim 14 wherein the controller comprises an integrated sensor hub of a central processing unit.

* * * * *